United States Patent Office 3,415,149
Patented Dec. 10, 1968

3,415,149
DEVICE FOR WASTELESS CUTTING OF METAL
Boris Zalmanovich Ziljberman, Vladimir Dmitrievich Grigorenko, and Mikhail Borisovich Ziljbershtein, Kharkov, U.S.S.R., assignors to Ukrainsky Gosudarstvenny Proektny Institute Tjazhpromelektroproekt, Kharkov, U.S.S.R.
Continuation of application Ser. No. 393,529, Sept. 1, 1964. This application Aug. 25, 1967, Ser. No. 663,449
7 Claims. (Cl. 83—311)

ABSTRACT OF THE DISCLOSURE

Apparatus for the wasteless cutting of a metal billet by means of flying shears provided with an automatic speed regulator controlled by a computer on the basis of measurements obtained during the actual operation of a rolling mill. These measurements are obtained by means of photoelectric transducers arranged along the path of the billet being rolled, a tachogenerator which measures the velocity of the billet being rolled, load relays detecting the position of the rolled billet as it passes along the finishing stands and an analog computer which receives signals from the transducers and generates a control signal which is applied to an automatic regulator which controls the velocity of the aforesaid shears.

---

This is a continuation of Ser. No. 393,529, filed Sept. 1, 1964, and now abandoned.

The present invention relates to automatic control of shears for cutting rolled stock when it leaves the rolls, of billet rolling mills. More particularly, the present invention relates to automatic control of flying shears of rolling mills. Known devices are based on registering the rolling parameters of each proceeding billet, e.g. on measuring the time during which the billet has been in the rolling mills, the results thus obtained being then used in cutting a subsequent billet. This technique can bring about considerable errors.

In the present invention said disadvantages are eliminated by using a device in which the parameters of rolling being measured pertain to the very billet being processed.

In billet rolling mills the rolled billet is cut into pieces by flying shears while coming out from the finishing stand.

The last piece, as a rule, turns out to be a short one. This piece cannot be used and is thus a waste piece.

For complete elimination of said waste, it is provided that the billet be cut into pieces of exact multiple lengths with least possible deviations from the actual length of each billet being cut.

The main object of the invention is to create such a device which would provide for measurement of the rolling on the roll table before finishing rolling (after cleaning the front end) and for measurement of the actual velocity of the rear end of the rolling during the process of finishing rolling, with subsequent feeding of the results of these measurements as input values into a computing unit which generates a corresponding resulting signal, which signal, being an additional driving signal, together with the main driving signal, would determine the required velocity for the flying shears and would control an automatic regulator for said shears, thus ensuring wasteless cutting of the billet.

In accordance with the present invention this object is achieved by using a device for wasteless cutting of metal as it leaves the rolls by means of flying shears provided with an automatic speed regulator, controlled by a computing unit on the basis of measurements of actual operation parameters of the rolling mill. As will be shown hereinafter, this can be effected with the help of photoelectric transducers set in the path of the rolled billet, a velocity transducer such as a tachogenerator which measures the velocity of the rolled billet, position transducers such as load relays detecting the position of the rolled billet as it passes the finishing stands, and a computing unit of analog type or the like, which receives the signals from said transducers and generates a resulting signal, said signal being then sent as an additional control signal to the automatic regulator controlling the velocity of the shears.

The invention comprises also all the novel features which follow in the description and the accompanying drawings given below, as well as all possible combinations thereof. Each particular embodiment of the invention depends on the technological conditions of rolling at a given rolling mill.

The description of the invention is made in connection with a billet rolling mill and relates to purely electric design features of the device.

The accompanying drawings diagrammatically represent the embodiment thus illustrating the principal nature of the proposed invention in the achievement of the object set forth above. In the drawing.

The device described below performs measurement of the length of the billet before rolling in the finishing group of stands, measurement of the velocity of the billet when the latter is drawn into the finishing stand group and calculates the number of pieces of a predetermined length (within preset tolerances) the rolled piece should be cut into, said piece being rolled having a given length.

In order to increase the accuracy, it is not the absolute values mentioned above that are measured, but their deviations from their basic (normal) values.

On the basis of the values obtained in the process of measurements a corresponding velocity of the flying shears is computed which provides the cutting of the billet into equal length pieces (without undersize wastes).

In a special computing unit an additional driving signal is generated which corresponds to said velocity of the flying shears, said additional driving signal (together with the main driving signal) being fed into the automatic regulator of the flying shears velocity, the required velocity of said shears being thus provided.

The value of the additional driving signal is computed according to the formula:

$$U_s = [U(\Delta + \alpha) - \Delta(\Delta + \alpha) - \gamma i]$$

where U is the value of the main driving signal of the automatic regulator of the flying shears velocity;
$\Delta$ is the relative deviation from the normal length of the billet (before finishing rolling);
$\alpha$ is the relative deviation from the normal velocity of the billet when entering the finishing stands;
$\gamma$ is a value depending on the number of the length of the pieces which the billet should be cut into;

3 a value automatically computed by the computing unit, said value corresponding to the minimum deviations of the length of the pieces from the nominal.

$U_a$ and U are the summed electric signals fed to the input of the automatic regulator of the shears velocity.
Signal $U_s$ is fed by the computing unit.
Signal U corresponds to the length of pieces equal to nominal.
This signal is set by the operator before starting the computing unit.

Figure 1:
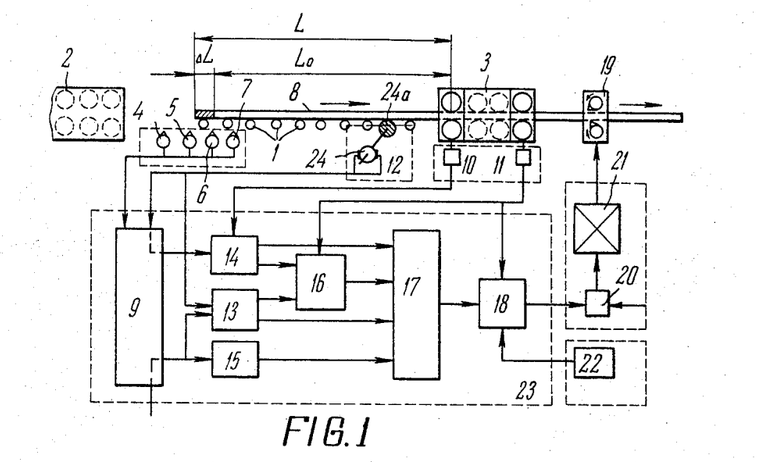
FIG. 1. is a block-diagram of the device.

The device for wasteless cutting comprises the following units (FIG. 1):

Roll table 1 extending from a group of cogging stands to a group of finishing stands 3;
Photoelectric transducers 4, 5, 6 and 7, operating in succession as billet 8 moves along roll table 1;
Search unit 9 following up the position of billet 8 with the help of photoelectric transducers 4, 5, 6 and 7, among which unit 9 selects one illuminated by billet 8 which is the most remote from finishing stands 3;
Transducers 10 and 11 detecting the position of the billet in finishing stands 3; transducer 10 operates when the front end of the billet enters finishing stands 3, transducer 11 operates when the front end of the billet comes from these stands;
Velocity transducer 12 which generates a signal proportional to linear velocity V of billet 8 at the entrance to the group of finishing stands 3;
Velocity unit 13 computing the value by the difference between the signal of velocity transducer 12 which is equal to the linear velocity of billet 8 and the signal corresponding to the normal velocity;
Length unit 14 computing the value by integrating the signal of velocity transducer 12 from the moment of receiving a command from position transducer 10 till the moment when billet 8 ceases to affect the photoelectric transducer which is the remotest from the finishing stands among those that were illuminated at the moment of receiving the command;
Length unit of pieces 15 which computes the values in accordance with said last illuminated photoelectric transducer;
Product unit 16 making the product of signals $\Delta$ and $\alpha$ on the command from transducer 10;
Computation unit 17, which sums the signals from all the preceeding units and generates, by selecting an appropriate value of $i$, resulting signal $$k = [(\Delta + \alpha) - \Delta(\Delta + \alpha) - \gamma i)]$$

Output unit 18 which generates additional driving signal $J_s$ corresponding to the set velocity of shears 19 by multiplying signal $k$ of computation unit 17 by a value, proportional to the main driving signal U of automatic velocity regulator 20, which is a part of drive 21 of shears 19;
Panel 22 by means of which the parameters of velocity unit 13 and output unit 18, proportional to main driving signal U are set, and the control of the whole computing device 23, e.g. of analog type, is effected: switching-on, switching-off, operation control, etc.

At the moment when moving billet 8 crosses the axis of flying shears 19, output unit 18 is disconnected from computing device 23 and is connected to automatic velocity regulator 20.

Additional driving signal $U_s$ generated by output unit 18, through panel 22 and through automatic velocity regulator 20 is fed to drive 21 of shears 19. Drive 21 changes its speed in accordance with the received signal for a new one, at which the cutting of billet 8 into a whole number of equal pieces is provided.

Described below are the operations performed by the proposed device, the electric circuit diagrams of the units taking part in these operations, and a computing device in its analog version.

In measuring the velocity of the billet take part velocity transducer 12 and velocity unit 13. The velocity transducer may be made as i.e. tachometer 24 which is rotated by friction roll 24–a mounted before finishing stands 3 of the mill. Roll 24–a is rigidly connected with the shaft of the tachogenerator and is mounted somewhat above the level of roll table 1.

In the process of rolling, friction roll 24–a rotates due to a contact with the metal and tachogenerator generates signal $U_t$ proportional to the linear velocity of billet 8 at the entrance of the group of finishing stands 3.

The signal from tachogenerator 24 comes to velocity unit 13 of computing unit 23 where relative deviation of the instantaneous velocity of the billet from the normal one is completed $$\alpha = \frac{V - V'}{V'}$$

where
V is the instantaneous velocity of the billet,
V' is the normal velocity.

Algebraic summation of the signals and their multiplying by a constant factor is performed by operational amplifier 25 (FIG. 3) of velocity unit 13. To the input of the unit are applied. Signal $U_t$ representing velocity V of billet 8 and a constant voltage, say, of −190 volts which corresponds to normal velocity V'.

Figure 3:
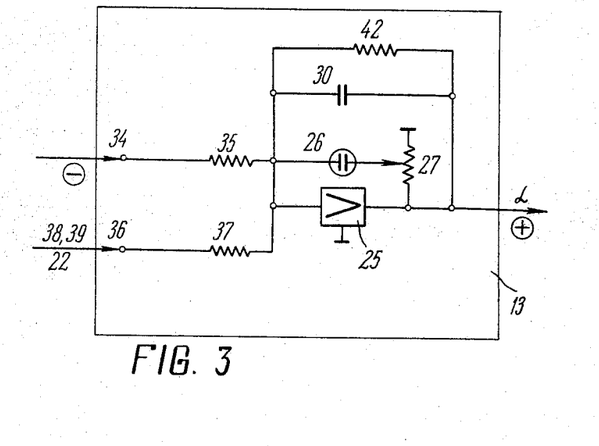
FIG. 3 is an electric circuit diagram of the velocity unit

The output voltage of the unit represents value $\alpha$.

The velocity is measured continuously throughout the rolling cycle. But for computing the correction signal in computing unit 23 only that value of $\alpha$ is used which takes place directly before the cutting of billet 8, when the billet is already taken by all the finishing stands 3 of the mill.

During those intervals of the rolling when the billets do not rotate friction roll 24–a, one of the input signals, $U_t$, of velocity unit 13 is absent. At that time at the output of the unit there appears a high (non-operating) voltage, which is limited by neon bulb 26. The limiting level is adjusted by potentiometer 27.

Figure 11:
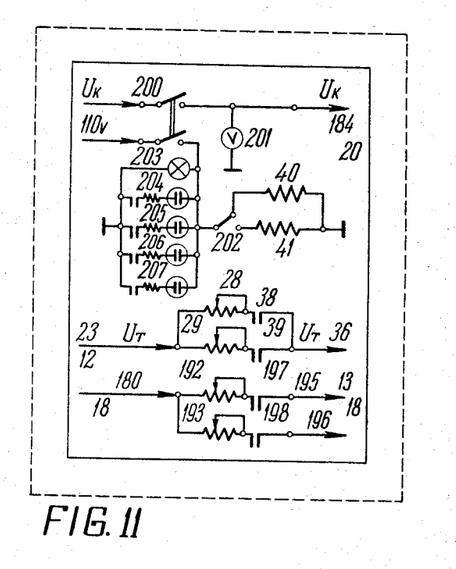
FIG. 11 is an electric circuit diagram of the control panel.

Velocity unit 13 is adjusted by means of adjustable resistor 28 or 29 which is mounted on control panel 22 (FIG. 11). This resistor is connected into the circuit through which the voltage at signal $U_t$ is applied to the input of velocity unit 13. Pulsation of this voltage is smoothed in the velocity unit by capacitor 30.

As it has already been stated, velocity transducer in the described device comprises friction roll 24–a and electric tachogenerator 24 the shaft of which is rigidly connected with said roll.

Friction roll 24–a is designed as a steel cylinder mounted in roller bearings somewhat above the level of roll table 1 which brings billet 8 to finishing stands 3 of the mill. The surface of the friction roll is provided with ribs for better contact between the roll and the billet.

Tachogenerator 24 is a low-power D.C. electric machine (tachodynamo).

Figure 2:
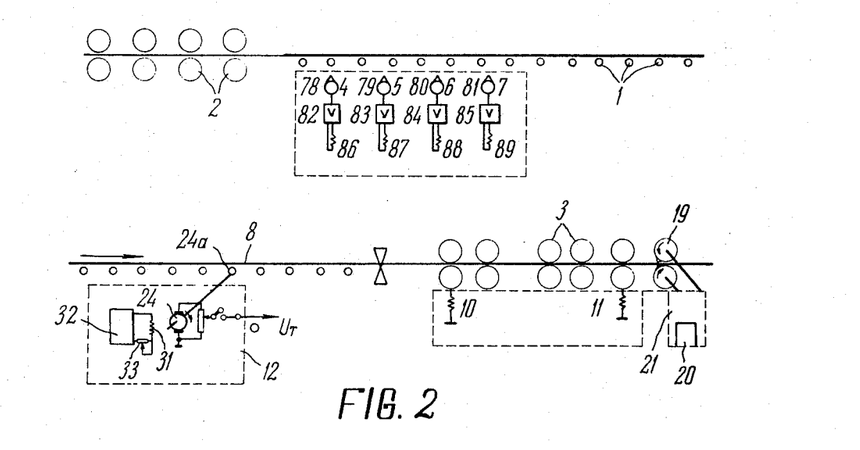
FIG. 2 diagrammatically represents the arrangement of the blocks and transducers of the device.

In order to provide stability of the generator current, its magnetic circuit is highly saturated, and a high resistance 33 is connected in series with excitation winding 31 supplied from a stable source 32 (FIG. 2).

Coupling of friction roll 24–a with tachogenerator 24 in order to reduce revolution pulsations at the output of the velocity transducer, is effected via a rigid clutch.

The influence of the brush contact is attenuated by using a high-ohmic winding in the armature of tachogenerator 24 and by using low-resistance brushes.

Velocity unit 12 (FIG. 3) comprises one operational amplifier 25 which has two inputs. To input 34 through constant resistor 35 constant voltage, e.g. of −190 volts is applied. To input 36, through variable resistor 28 or 29 (mounted on the control panel) and through constant resistor 37, signal $U_t$ of velocity unit 12 is applied. For each program (of the rolling-stock assortment) special variable resistor 28 or 29 is used, connected to the input of the unit by normally open contact 38 or 39 of the corresponding program relay 40 or 41 mounted in the control panel (FIG. 11).

Into the feedback circuit of the amplifier constant resistor 42 and capacitor 30 are connected, the latter serving for smoothing the pulsations of the input signal.

When the output voltage of amplifier 25 exceeds the permissible level, the neon bulb lights up. The signal coming through bulb 26 into the grid circuit of amplifier 25 opposes further increase of the voltage at the output of the unit.

The output signal of unit 12 which is the value α of relative deviation of the billet velocity from the normal velocity is fed to unit 15 of the length pieces, to product unit 16 and to computation unit 17.

The length of the billet (before rolling in finishing stands) is measured by lengths unit 14 in conjunction with photoelectric transducers 4, 5, 6 and 7, velocity transducer 12 and search unit 9.

Photoelectric transducers 4, 5, 6 and 7 positioned in front of the mill can be made as photoelectric relays arranged in the zone where the rear ends of the billets may possibly be. Position transducers 10 and 11 can be made as load relays of the mill stands. The measurement of the billet length starts by a signal from position transducer 10 at the moment when the billet enters the finishing stands of the mill.

Since the distances to photoelectric transducers 4, 5, 6 and 7 which fix the rear ends of the billets are predetermined, it is not necessary to measure the whole length of the billet.

Only that part of the billet should be measured, which goes beyond the last illuminated photorelay. The distance to this photorelay is taken for the normal length.

For finding the last illuminated photoelectric transducer search unit 9 is provided (FIG. 4), in which the circuits can be commutated, e.g. by a step-by-step switch. The step-by-step switch described below is a multiposition switch, coil 43 of which is energized through its own normally closed contact 44. Fixed contacts 1c, 2c, 3c, . . ., 27c of the switch are grouped into four similar sections 45, 46, 47 and 48. Movable contacts (knives) 49, 50, 51 and 52 successively close the circuits of the fixed contacts, each in its section. The control circuit of search unit 9 is made so that in the process of measuring the length movable contacts take positions corresponding to the last illuminated photoelectric transducer. The contact of the second section 46 of the step-by-step switch then cuts in into the input circuit of amplifier 53 of lengths unit 14 a resistor, corresponding to normal length, thereby making it possible to perform multiplication of the amplifier signal by the value of $1/l_0$. At the same time the contact of the third section 47 of the step-by-step switch will introduce into the input circuit of amplifier 54 of the same unit a correction to the length being measured (an individual one for each normal length value) connected with setting of the photoelectric transducers.

As it has been already pointed out, the measurement of the billet length starts at its entering the finishing stands of the mill. At that moment the signal from velociy transducer 12 starts to come to the input of lengths unit 14, where by integration relative deviation of the length of the billets from the normal length.

$$\Delta = \frac{\Delta L}{L_0}$$

is computed, where
ΔL is the length of that part of the billet which at the moment of measurement is beyond the last illuminated photoelectric transducer, and
$L_0$ is the normal length.

Figure 5:
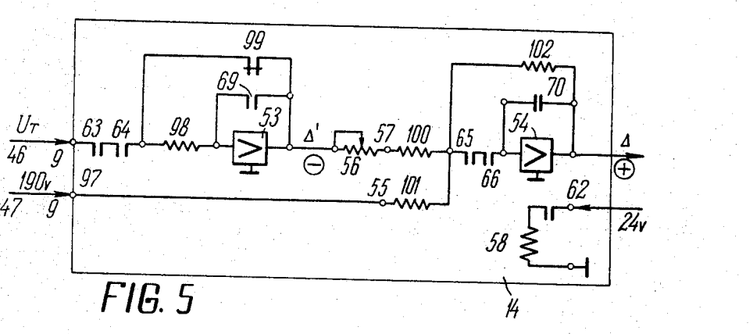
FIG. 5 is an electric circuit diagram of the length unit

Integration of the input signal which is proportional to the velocity of the billet and its division by the constant corresponding to the normal length is perfermed by operational amplifier 53 of lengths unit 14 (FIG. 5.)

In the process of measurement to the input of th amplifier through the contacts of the second section 4 of the step-by-step switch signal $U_t$ from tachogenerate 24 is fed continuously. When the last illuminated phote electric transducer is no longer illuminated, the measure ment is finished, the input of amplifier 53 is disconnecte from the signal source and the amplifier is brought ove to the registering mode. Simultaneously 54 of lengths un 14 is brought to the same mode amplifier. The functio of amplifier 54 is to sum the signal of the integrator (am plifier 53) and the correction to the measured length ap plied to its input 55 through the third section 47 of th step-by-step switch in the form of a constant voltage, say of —190 volts.

The adjustment of lengths units unit 14 is effected b means of regulator 56, connected into input circuit 57 o amplifier 54. The control of operations of lengths un 14 is effected by relay 58 (FIG. 5), relay 59 (FIG. 4) photoelectric transducers 4, 5, 6 and 7. and search un 9, the operation of said units being considered in deta below.

Search unit 9 performs its operation cycle by the com mand from the photoelectric transducers, contacts 60–6 of which are connected to section 45 of the step-by-ste switch, said section being used for effecting the contro Before starting the operation, movable contacts 49, 5( 51 and 52 of the step-by-step switch are in position 1c o their sections 45 46, 47 and 48. When the billet emergin from break-down stands 2 lights photoelectric transduce 4, normally open contact 60 of this transducer in sectio 45 of the step-by-step switch closes. Coil 43 of the step by-step switch receives a current pulse. Movable contac 49 of the step-by-step swtich passes from contact 1c t contact 2c and prepares the circuit actuating coil 43 o the step-by-step switch from the side of a successive (i accordance with the travel of the billet) photoelectri transducer 5. Then the billet actuates photoelectric trans ducer 5 and movable contact 49 of the step-by-step switcl passes over the following position 3c.

Thus, as billet 8 advances, the movable contact of th step-by-step switch, as it were following up the front en of the billet, passes over first four positions and stops i the fifth one, the normally closed contact of photoelectri transducer 4 being open. Movable contact 49 remains i this position until the rear end of the billet leaves photo electric transducer 4. At that moment the normally close contact of said transducer 4 closes and movable contac 49 starts moving again. Now, it "follows up" the positio of the rear end of the billet. In the above-described manne movable contact 49 of the step-by-step switch passes ove the following four positions and stops on fixed contact 9c The operation cycle of the step-by step switch is com pleted. Together with movable contact 49 of the step-by step switch move (make "steps") other movable contact 50, 51 and 52 during the cycle and close similar contact of their sections 46, 47 and 48. The second cycle begin when a new rough-rolled billet appears on roll table before finishing stands 3 of the mill, and it finishes whe the movable contacts of the step-by-step switch reacl fixed contact 17c.

After the third cycle the movable returns to their initia position 1c. Idle contacts 25c and 26c are passed over b the movable contacts of the step-by-step switch in a self action mode. As the movable contacts move, relay 5! operates.

When relay 58 is deenergized, relay 59 is periodicall disabled or enabled under the action of normally close contact 44 which opens for short periods of time as th movable contacts of the step-by-step switch pass from on fixed contact to another. Each time as relay 59 operate it shunts with its normally open contact 60 normally close contact 61 of relay 58 in its coil circuit. Therefore draw ing in of relay 58, which takes place under the action o normally open contact 62 of position transducer 10, effect relay 59 not directly, but only at the following "step" o the movable contacts.

After billet 8 has entered finishing stands 3 and relay 8 has operated, relay 59 is as usual disabled at the first step of the movable contacts. However, there occurs no subsequent operation of this relay as normally closed contact 61 of relay 58 is open. Now energizing of the coil of relay 59 becomes impossible till relay 58 is disabled, i.e. till the given billet has been rolled.

Therefore only once during the operation cycle of the step-by-step switch, relay 58 and relay 59 turn out to be simultaneously energized (drawn in). This is used for controlling lengths unit 14 and (as it will be described below) length pieces unit 15.

At the inputs of amplifiers 53, 54, and 55 employed in said units, connected in series are normally open contacts 63 and 64, 65 and 66, 67 and 68 of relays 58 and 59. At the moment of the billet entering finishing stands 3 all the normally open contacts of relays 58 and 59 turn out to be closed and measurements are started.

The amplifiers perform their functions, integrating, summation, multiplying by constants etc. Measurements continue for the period of time necessary for the excess of the billet to pass the last illuminated photoelectric transducer.

When this transducer is disabled, the movable contacts of the step-by-step switch make a step, relay 59 is deenergized and the input circuits of amplifiers 53, 54 and 55 are disconnected. These amplifiers are brought to the "registering" mode, since in their feedback circuits remain only capacitors 69, 70 and 71. Amplifier 53 retains its signal till the billet starts coming out from finishing stands 3, and amplifiers 54 and 55 retain their signals up to the beginning of a new measurement.

As it has been already pointed out, sections 46, 47 and 48 of the step-by-step switch serve for commutating the input resistors of amplifiers 53, 54 and 55 in accordance with normal length $L_0$ of billet 8. For this purpose to fixed contacts $1c, 2c, 3c, \ldots, 27c$ of the step-by-step switch, which are closed in succession (in corresponding sections) by movable contacts 50, 51 and 52 in the process of "following up" the rear end of billet 8, resistors 72 or 73, 74 or 75, 76 or 77 (FIG. 4) are connected, said resistors representing the normal lengths. When measurements are being made, each movable contact closes the fixed contact corresponding to the last lighted photoelectric transducer, and the required resistors are connected into the input circuits of amplifiers 53, 54 and 55 (FIG. 5).

Figure 4:
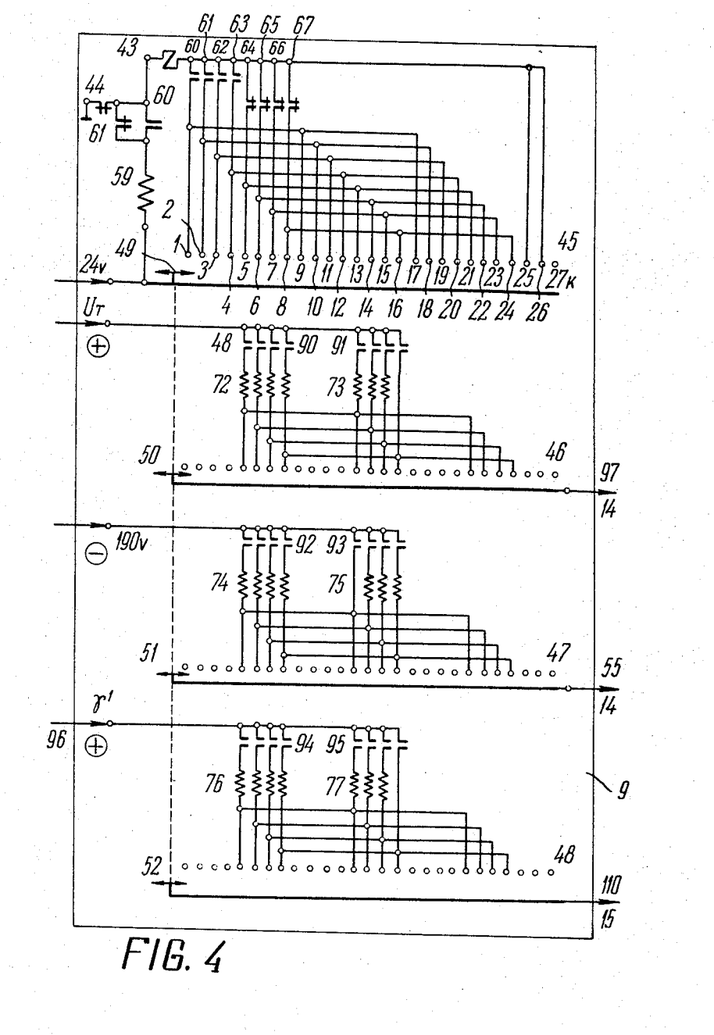
FIG. 4 is an electric circuit diagram of the search unit

Photoelectric transducers 4, 5, 6 and 7 indicating the position of the billet before the mill are a system of several e.g. of four, photoelectric relays, arranged in the zone of possible positions of the rear ends of the billets. These relays comprise photoresponsive elements 78, 79, 80 and 81 (FIG. 2), signal amplifiers 82, 83, 84 and 85, and output devices, e.g. contact electromagnetic relays 86, 87, 88 and 89 (FIG. 2). Contacts 60–67 of the electromagnetic relays are connected into the circuit of controlling section 45 of the step-by-step switch of search unit 9 (FIG. 4).

The distances between the photoelectric transducers are chosen to be maximum on condition that the quantity of metal defined between any two neighboring transducers do not surpass the quantity of metal within the mill during rolling. Thereby it is guaranteed that the measurement of the length which starts as the billet enters finishing stands 3 of the mill will be over by the moment the billet appears from the finishing stands, i.e. prior to its being cut by the shears.

Transducers 10 and 11 which indicate the position of the metal in the mill are load relays of the finishing stands which react, e.g. upon the static current of the armature circuit of the motor driving the rolls.

Search unit 9, as stated above, comprises a step-by-step switch, which has at least four working sections, relay 59 and the input resistors of amplifiers 53 and 54 of length unit 14 and of amplifier 55 of length pieces unit 15.

Section 45 serves for controlling the step-by-step switch. To movable contact 49 of this section supply voltage of coil 43 of the step-by-step switch is fed. To fixed contacts $1c, 2c, \ldots, 27c$ of the step-by-step switch normally open contacts 60, 61, 62, 63, and normally closed contacts 64, 65, 66 and 67 of photoelectric relays 4, 5, 6, 7 are connected in the order corresponding to the respective arrangement of said relays on the roll table. The total number of contacts per cycle is $2n_1$, where $n_1$ is the number of the photorelays positioned on the roll table.

To the normally closed power contact of the step-by-step switch the coil of relay 59 is connected. Into the circuit of this coil parallel-connected (normally closed) contacts of relay 58 and (normally open) contacts of relay 59 are introduced. Relay 59 is disabled at each "step" of the movable contacts of the step-by-step switch and operates only if relay 58 is deenergized.

Amplifier 54 has two inputs 57 and 55. To input 57 through potentiometer 56 and constant resistor 100 the output signal of amplifier 53 is fed. To input 55 through constant resistor 101 and one of input resistors 74 or 75 connected by the contact of section 47 of the step-by-step switch constant voltage, e.g. of −190 volts, is fed. Into the feedback of the amplifier constant resistor 102 and capacitor 70 are included, capacitor 70 serving for registering the output signal.

Into the input circuits of amplifiers 53 and 54 series-connected normally open contacts 63, 64 and 65, 66 of relay 59 and relay 58 are included. By means of these contacts the input circuits of amplifiers 53 and 54 are connected to the circuit at the start of measurements and these amplifiers being brought over to the registering mode on completion of the measurements.

The output signal of lengths unit 14 representing relative deviation $\Delta$ of the length of the billet from the normal length, is fed to length pieces unit 15, to product unit 16, and to computation unit 17.

The number of length pieces the billet is to be cut into, is computed by length pieces unit 15 with participation of photoelectric transducers 4, 5, 6 and 7, position transducer 10 and search unit 9.

The expected number of length pieces is determined before rolling the billet, simultaneously with measuring its length. When position unit 10 operates, to the input of length pieces unit 15 arrive the signals of deviation $\alpha$ from velocity unit 13 and the signals of deviation $\Delta$ from length unit 14.

Length pieces unit 15 starts to compute the value $$\gamma = \frac{1}{N}[1-(\Delta+\alpha)]$$

where

N is the number of length pieces that can be contained within the normal length $L_o$, i.e. from finishing stands 3 up to the last lighted photoelectric transducer.

At the moment of extinction of the last illuminated photoelectric transducer the measurement of the length is over.

Consequently at the extinction of this transducer $\gamma$ also acquires its final value.

Figure 6:
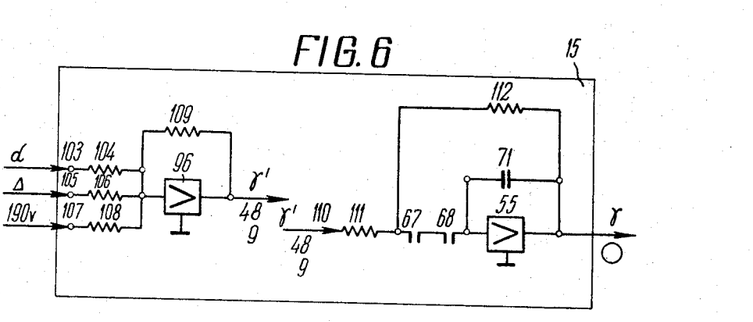
FIG. 6 is an electric circuit diagram of the unit of length pieces.

The operation of algebraic summation is carried out by amplifier 96 of the length pieces unit 15 (FIG. 6). To its input are fed the signals of deviations $\alpha$ and $\Delta$ and a constant voltage, e.g. of −190 volts which represents unity in a certain scale. The input signal of amplifier 96 is sent to the input of amplifier 55 through a contact of section of the step-by-step switch and series-connected normally open contacts 67 and 68 of relay 58 and relay 59. Upon operation of position transducer 10 the input circuit of amplifier 55 closes and this amplifier performs the operation of multiplying the input signal by the value $1/N$.

At this time the movable contacts of the step-by-step switch take the position corresponding to the last illuminated photoelectric transducer. The resistor, necessary for carrying out said multiplication is cut into the input of amplifier 55 by movable contact 55 of section 48 of the step-by-step switch.

At the moment of extinction of the last illuminated photoelectric transducer relay 59 opens its contacts at the input of amplifier 55. The input signal is no longer fed into the grid circuit of the amplifier. Simultaneously the feedback circuit of amplifier 55 changes. In this circuit (due to the opening of the contact of relay 59) only capacitor 71 remains cut in and thereby the amplifier is brought over into the "registering" mode. Length pieces unit 15 preserves its signal till the following measurement.

Length pieces unit 15 comprises two operational amplifiers 96 and 55. Amplifier 96 has three inputs, to input 103 through resistor 104 the signal of deviation $\alpha$ is fed, to input 105 through resistor 106 the signal of deviation $\Delta$ is fed, and to input 104 through resistor 108 constant voltage —190 volts is fed. Into the feedback of the amplifier resistor 109 is included. Amplifier 55 has one input 110. To this input through constant resistor 111 and to one of the sections connected by movable contact 52 of section 48 of the step-by-step switch the output signal of amplifier 96 of the same unit is fed.

To the input circuit of amplifier 55 are connected in-series normally open contacts 67 and 68 of relay 58 and relay 59. These contacts, when closing, create a circuit for the input signal of amplifier 55 and the start of measurements, and when opening they bring the amplifier over to the registering mode (on completion of the measurements). Into the feedback circuit of the amplifier constant resistor 112 and capacitor 71 are connected, the latter performing the operation of registering.

The input signal of length pieces unit 15 which represents the expected number $\gamma$ of the length pieces is fed to computation unit 17.

The computation of the correction signal includes two independent operations: computation of the product and determining of the optimum correction signal.

Figure 7:
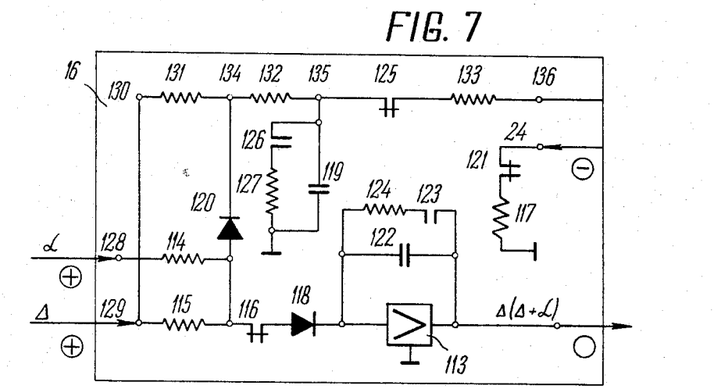
FIG. 7 is an electric circuit diagram of the product unit

The product is computed by product unit 16 by the command of transducer 11 determining the position of the billets in the finishing stands of the mill. Upon coming out of the front end of the billet from the finishing stands said transducer operates and to the input of amplifier 113 of product unit 16 (FIG. 7) there is applied the signal of deviation $\alpha$ from velocity unit 13 and the signal of deviation from lengths unit 14.

In the product unit these values are multiplied in accordance with the formula $$\Delta(\Delta+\alpha)$$

The operation principle of product unit 16 is; that if one of the multiplicands be fed to the integrator as an input value and the second multiplicand be used for (proportionally) regulating the time of integration, then at the output of the integrator the required product will be obtained.

The role of such an adjustable integrator is, in our case, played by amplifier 113. To the input of this amplifier signals $\alpha+\Delta$ are fed through constant resistors 114 and 115 normally closed contact 116 of relay 117, and gate 118. At the output of the amplifier there is generated a signal equal to $\Delta(\Delta+\alpha)$. The operation of amplifier 113 is controlled by time capacitor 119 through gate 120.

Product unit 16 (FIG. 7) operates as follows. When there is no billet in the mill, normally closed contact 121 of load relay 11 is closed and relay 117 is energized. The input of amplifier 113 is disconnected by normally closed contact 116 of relay 117. Integrating capacitor 122 of the feedback circuit of amplifier 113 is connected by normally open contact 123 of relay 117 to discharging resistor 124. The source of the stable voltage of —190 volts is disconnected from time capacitor 119 by normally closed contact 125 of relay 117, and this capacitor is short-circuited through normally open contact 126 of relay 117 to discharging capacitor 127.

By the moment the billet comes out from the finishing stands of the mill, the values $\alpha$ and $\Delta$ have been already computed and fed to product unit 16, to input 128 of amplifier 127, and $\Delta$ to input 129 of the same amplifier and to point 130 of divider 131–132–133 respectively. The potential at point 130 is equal to (positive) signal $\Delta$ the potential at point 134 is equal to 2, and the potential at point 135 is near to zero, since the resistors of said divider are chosen so that $R131=R132 \gg R127$. Upon de energizing of relay 117 (due to operation of position transducer 11) amplifier 113 starts integrating the sum signal of ($\Delta+\alpha$). This signal freely passes through gate 118, the signals of deviations $\Delta$ and $\alpha$ being positive Simultaneously with the integration, capacitor 119 is being charged through resistor 113 with constant negative voltage, e.g. of —190 volts. As said capacitor charges the distribution of potential along divider 131–132–13. changes. The positive potential of point 134 decrease and then becomes negative. As the potential of point 134 passes through zero, gate 120 begins to pass a signal (the potential of point 135 at that moment being negative and its value being equal to $\Delta$). Through gate 120 to the input of amplifier 113 there comes a negative signal from divider 131–132–133; this signal being rather powerful it "kills" both positive signals of deviations $\alpha$ and $\Delta$. The appearance of said "killing" signal results in stopping the integration, as gate 118 does not pass a negative signal Thus the time of integration is equal to the time of charging capacitor 119 up to a level at which the potential at point 134 becomes zero. With some slight assumptions this time may be regarded proportional to the signal of deviation $\Delta$. When the integration is thus over and the input is disconnected by gate 118, amplifier 113 is brought over to the registering mode. Upon coming of the billet from the finishing stands position transducer 11 is disconnected and relay 117 operates again. Product unit 16 returns to its initial state. Capacitors 119 and 122 are discharged.

Amplifier 113 has three inputs. To input 128 through resistor 114 signal of deviation $\Delta$ is fed. To input 129 through resistor 115 signal of deviation $\Delta$ is fed. To the input of amplifier 113 through gate 120 a signal from point 134 of divider 131–132–133 is fed. All said input signals are supplied into the grid circuit of amplifier 113 through normally closed contact 116 of relay 117 and through gate 118.

External voltages are applied to two extreme points of the divider: signal $\Delta$ is applied to point 130 and voltage of —190 volts is applied to point 136. From two middle points 134 and 135 of the divider the voltages are supplied to the circuit of unit 16: the signal, stopping the integration performed by amplifier 113 coming from point 134 and the voltage charging auxiliary time capacitor 119 coming from point 135.

Auxiliary capacitor 119 serves for obtaining the time interval, proportional to the signal of deviation $\Delta$. This capacitor is charged with voltage of —190 volts considerably exceeding the value of deviation $\Delta$. Therefore it is possible to assume that in the time interval under consideration the voltage across the capacitor grows practically linearily as the function of time. In parallel with capacitor 119 a discharge circuit is connected, said discharge circuit comprising resistor 127 and normally open contacts 126 of relay 127.

In product unit 16 relay 117 is provided, which is controlled by contact 121 of position transducer 11. The contacts of relay 117 are connected into the input circuit of amplifier 113 and in discharging circuits of capacitors 119 and 122 of unit 16. When the front end of the billet comes out from the finishing stands of the mill, relay 117 is disabled. Its contacts 126 and 123 disconnect the discharging circuits of capacitors 119 and 122, and contact 116 closes the input of amplifier 113. Product unit 16 comes into operation and performs its function. The output signal of this unit, which represents the value $\Delta+\alpha$ is fed to the computation unit.

Optimum correction signal is computed by computation unit 17. To the input of computation unit 17 signals are fed from velocity unit 13 (continuously), from length unit 14 and from length pieces unit 15 (upon extinction of the last illuminated photoelectric transducer), and also from product unit 16 (upon the coming of the front end of the billet from the finishing stands of the mill). Computation unit 17 sums up all the signals fed to its input according to the formula $$K=\Delta+\alpha-\Delta(\Delta+\alpha)-\gamma i$$

where $i$ is the value selected automatically in the process of computation for obtaining minimum variation (deviation) of the lengths of the length pieces from the nominal.

Computation unit 17 (FIG. 8) performs its operation automatically and continuously. Summation of signals is made by several, e.g. by three amplifiers 137, 138 and 139 of unit 17. The value "$i$" is determined by the same amplifiers with the help of a diode circuit.

Figure 8:
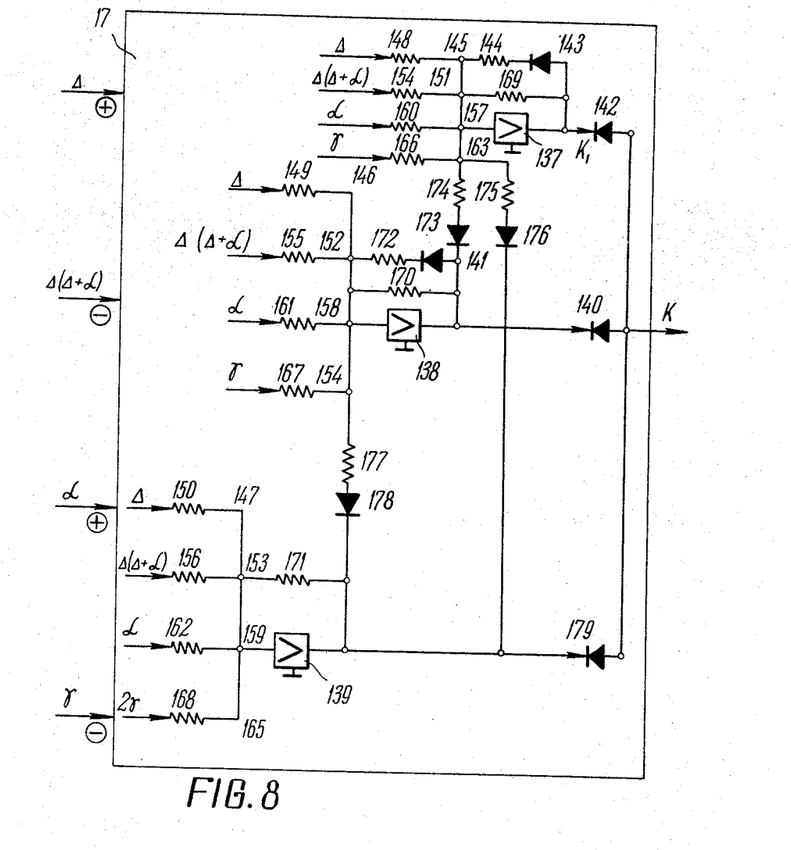
FIG. 8 is an electric circuit diagram of the computation unit.

Unit 17 operates as follows. The input signals of unit 17 are fed simultaneously to the inputs of all three amplifiers 137, 138, 139. Each of these amplifiers computes its correction signal.

Amplifier 137:
$$K_1=\Delta+\alpha-\Delta(\Delta+\alpha)$$

Amplifier 138:
$$K_2=\Delta+\alpha-\Delta(\Delta+\alpha);-\gamma$$

Amplifier 139:
$$K_3=\Delta+\alpha-\Delta(\Delta+\alpha)-2\gamma$$

To the output of unit 17 only one of said signals is passed, namely the one having the least negative value. Said signal is the optimum one as it gives the least change of the velocity of the shears, and hence, the least deviation of the length of the length pieces from the nominal.

Let us consider the interaction of all the amplifiers of computation unit 17 by analyzing one concrete example.

Let at the output of amplifier 138 there be a negative signal $K_2$. This signal passes freely through gate 140 to the output of the computation unit. Simultaneously through gate 141 said signal passes to the input of amplifier 137 and suppresses all the other input signals of this amplifier. As a result at the output of amplifier 137 there appears a positive signal which is not passed by gate 142. Gate 143 and resistor 144 serve for limiting nonworking (positive) signal at the output of amplifier 137 when the "suppressing" signal of amplifier 138 operates.

If the total signal at the output of amplifier 138 is positive, then it is not passed by gates 140 and 141 and therefore exerts no influence upon the rest of the circuit of unit 17. Thus only amplifier 137 remains operative. At the output of this amplifier a negative signal will necessarily be generated due to the fact that to the input of the amplifier are fed positive signals of deviations $\iota$ and $\Delta$ and the signal of the value $\Delta(\Delta+\alpha)$ which, though negative, is considerably less than the sum of the first two signals.

Thus, when there is no "killing" signal from amplifier 138 to the output of computation unit 17 from the output of amplifier 137 a signal will be fed, which will pass to the following output unit 18 of the device. Each of the amplifiers of computation unit 17 has four outputs for operating signals, to which constant resistors are connected.

To inputs 145, 146 and 147 of amplifiers 137, 138, 139 through resistors 148, 149 and 150 a signal of deviation is fed, to inputs 151, 152 and 153 through resistors 154, 155 and 156 a signal of the value $\Delta(\Delta+\alpha)$ is fed, to inputs 157, 158 and 159 through resistors 160, 161 and 162 a signal of deviation is fed. To inputs 163, 164 and 165 through resistors 166, 167 and 168 a signal of the value $\gamma$ is fed, which increases from amplifier to amplifier (for amplifier 137 is it 0, for amplifier 138 it is $\gamma$, for amplifier 139 it is $2\gamma$, and so on). The fedback circuits of amplifiers 137, 138 and 139 contain constant resistors 169, 170 and 171. Parallel to these resistors in the feedback circuits of all the amplifiers except the last one (amplifier 139) a shunting network is incorporated, comprising a small capacitor and a diode (144 and 143 for amplifier 137, and 172 and 173 for amplifier 138 respectively). This network is provided for "cutting" positive signals if they appear at the outputs of amplifiers 137 and 138.

Besides, the input of each amplifier is connected with the outputs of all the following amplifiers by means of networks, comprising small resistors and diodes (174 and 141, as well as 175 and 176 for amplifier 137, and 177 and 178 for amplifier 138 respectively). These networks are provided for passing a negative signal, if such a signal appears at the output of one of the following amplifiers, that is, at the output of amplifier 138 or 139.

The ouput of amplifiers 137, 138 and 139 are connected to the common output of computation unit 17 through gates 142, 140 and 179, passing only negaive signals.

The resulting signal K, computed by computation unit 17 is fed to output unit 18, where, by means of multiplying by the value, proportional to the main driving signal U of automatic regulator 20 of the velocity of shears 19, additional signal $$U_s=UK=U[\Delta+\alpha-\Delta(\Delta+\alpha)-\gamma i]$$

is computed.

Figure 9:
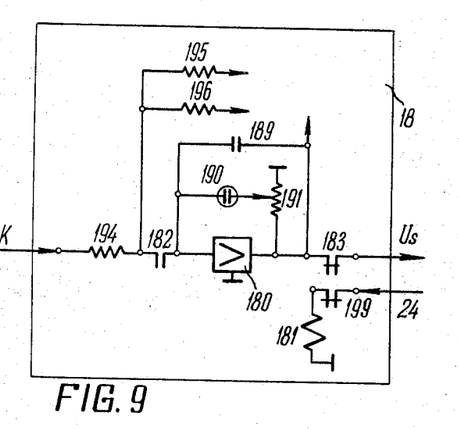
FIG. 9 is an electric circuit diagram of the output unit

The operation of multiplication is performed by amplifier 180 of output unit 18 (FIG. 9). The feedback resistance of this amplifier is set by the operator before rolling, simultaneously with (and according to) the main driving signal U of automatic regulator 20 of the velocity of shears 19.

Additional signal $U_s$ is fed to automatic regulator 20 of the velocity of shears 19 at the moment when billet 8, having come out of finishing stands 3 of the mill, reaches the line of cutting by the shears. By that time all the units of computing device 23 have finished their operations and their output signals acquire final values.

The output signal of unit 18 is generated on the command of relay 181 which is deenergized with a time delay after transducer 11 of the position of finishing stands 3 of the mill has operated.

The value of the time delay is selected so that by the moment relay 181 is deenergized, billet 8 would have covered the distance from said stands to shears 19. By its normally open contact 182 relay 181 disconnects output unit 18 from the rest of computing device 23 and brings amplifier 180 of unit 18 over to the registering mode. Simultaneously normally closed contact 183 of relay 181 connects output unit 18 to automatic regulator 20 (e.g. an electronic one) of the velocity of shears 19.

Figure 10:
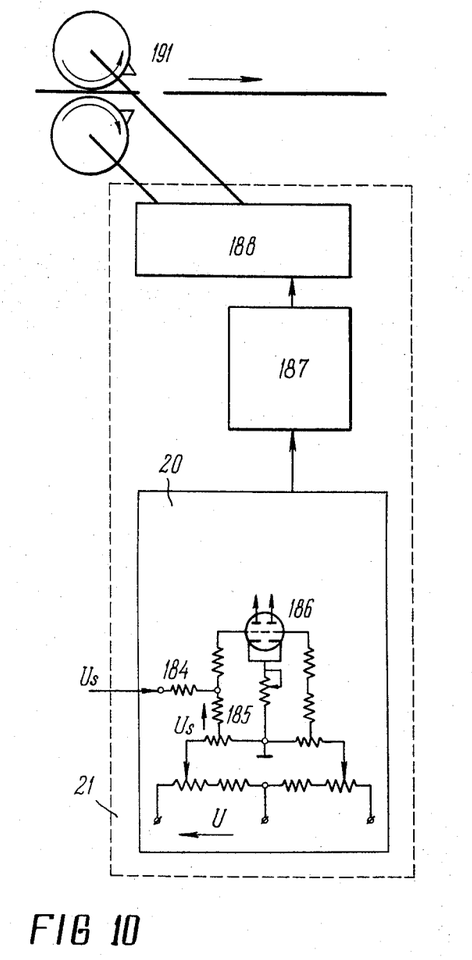
FIG. 10 is a block-diagram of the flying shears drive with an automatic velocity regulator.

Additional driving signal $U_s$ is fed to the first stage of the regulator from divider 184–185 (FIG. 10), one arm of which is cut into the grid circuit of tube 186 of this stage. Servodrive 21 of shears 19 operates in accordance with the feed driving signal $U_s$. The speed of drive 187 which is connected with shears 19 via reducer 188 is changed accordlingly by the moment of cutting the first piece from billet 8, and the billet is cut at a new velocity of shears 19. This now velocity of the shears provides for such length of all the pieces of the given billet 8 (including the last piece) which is within the predetermined tolerance.

When the rolling of billet 8 is over, relay 181 (FIG. 9) disabled with a time delay after position transducer 11 has operated, discharges registering capacitor 189 of output unit 18, disconnects this unit from automatic regulator 20 of the velocity of shears 19, and connects unit 18 to the rest of computing device 23.

The speed of drive 187 (FIG. 10) of shears 19 after the additional driving signal $U_s$ has ceased returns to its initial value.

For limiting the output signals fed from computing device 23 to automatic regulator 20 of the shears velocity neon bulb 190 is provided in the output unit (FIG. 9), connected into the feedback circuit of amplifier 180 through potentiometer 191. The limiting level is controlled by said potentiometer.

Output unit 18 is adjused by means of adjustable resistor 192 or 193 (FIG. 11) connected into the feedback circuit of amplifier 180. These resistors are mounted on control panel 22. Output unit 18 comprises one amplifier 180. To the input of this amplifier through resistor 194 from computation unit 17 output signal K is fed. Into the feedback circuit of amplifier 180 constant resistor 195 of 196 and variable resistor 192 or 193 are connected. Variable resistors 192 or 193 which serve for adjusting unit 17, are mounted on control panel 22.

The feedback circuits of amplifier 180 are switched over by contacts 197 and 198 of program relays 40 and 41 in accordance of the assortment of the stock.

Besides, connected into the feedback of amplifier 180 is capacitor 189, which serves for registering the output signal of unit 18. For limiting the level of this signal an additional feedback circuit is provided, which comprises neon bulb 190 and potentiometer 191. When the output signal of amplifier 180 exceeds the permissible value, bulb 190 lights up and a voltage is fed to the input of amplifier which opposes to further increase of the output signal.

The unit is provided with relay 181, controlled by contacts 199 of transducer 11 of the position of finishing stands 3 of the mill. Normally open contact 182 of relay 181, which performs operations of disconnecting the unit and of bringing over amplifier 180 to the registering mode, is connected into the input circuit of amplifier 180. Normally closed contact 183 of relay 181, which connects computing device 23 to regulator 20 of the velocity of shears 19, is connected into the output circuit of the unit.

The output signal $U_s$ of the unit which is additional voltage generated by computing device 23, is fed to the first stage of regulator 20 of the velocity of the shears.

The operation principle and type of regulator 20 of the velocity of shears 19 is determined by the requirements to drive 21 of shears 19, which requirements can be rather various.

The circuits for feeding correction signal $U_s$ generated by computing device 23 to said regulator are varied in accordance with the particular design of this regulator, especially of the first stage thereof.

Feeding of the correction signal to velocity regulator 20, the latter being made e.g. as an electronic amplifier, is effected by means of a high-ohmic divider 184–185, one arm 185 of which is cut into the grid circuit of the tube 186 of the first stage of regulator 20, the other arm being connected to output unit 18.

The operation cycle of the device for wasteless cuttings of metal consists of four steps.

Step 1: preparation of measurements

A successive billet 8 starts illuminating photoelectric transducers 4, 5, 6 and 7 positioned along the roll table before finishing stands 3. Search unit 9 is actuated and "follows up" first the front and then the rear end of the billet. When all the photorelays are illuminated, movable contacts 49, 50, 51 and 52 (FIG. 4) of the step-by-step switch of unit 9, having passed over four positions following the front end, stop. On appearing of the rear end of the billet the movable contacts of the step-by-step switch start making steps again, following the rear end. Meanwhile relay 59 is periodically actuated and deenergized, closing and opening its contacts in the circuits of lengths unit 14 and length pieces unit 15. Simultaneously the contacts of the step-by-step switch (in accordance with the serial number of the last illuminated photoelectric transducer) switch over the input resistors of said units, thus preparing them for making measurement which are due to start at the moment of operation o transducer 10 of the position of finishing stands 3 of th mill. In the course of its travel billet 8 reaches friction roll 24–a before the mill. At the output of velocity trans ducer 12. there appears signal $U_t$, proportional to th actual velocity V of the strip. Velocity unit 13 generate a preliminary value of the signal of deviation.

Step 2: measurements

When the billet is delivered to the group of finishin; stands 3 of the mill, position transducer 10 operates an relay 58 is enabled (FIG. 5). The inputs of amplifier 53, 54 and 55 are connected to the corresponding signa sources through normally open contacts 63 and 64, 6! and 66, 67 and 68 of relay 58 and relay 59. Measurement are started of the length $\Delta L$ of the excess of the rougl billet and the expected number N of the length pieces. Operational amplifier 53 functioning as an integrato and being fed by voltage at the signal $U_t$ through sectio 46 of the step-by-step switch of search unit 9 (FIG. 4 stores the signal and transmits it to amplifier 54 (FIG. 5 which computes the value $\Delta$ taking into account the in strumental error of the assembly of the photoelectri transducers. Simultaneously a signal of deviation $\gamma$ i formed at the output of amplifier 55, the input of whicl through section 48 of the step-by-step switch is connecte to amplifier 96 which computes the sum $1-(\Delta+\alpha)$ When the rear end of billet 8 passes by the last illumi nated photoelectric transducer, the movable contactor of the step-by-step switch make a successive step. Rela 59 is disconnected and the measurements of the param eters of billet 8 (with the exception of 2) are stopped Amplifiers 54 and 55 register their respective results an feed them to the inputs of product unit 16 and computa tion unit 17.

Step 3: computations

On coming out of the billet from finishing stands 3 o the mill, position transducer 11 operates and deenergize the coils of relay 117 (FIG. 7) and 181 (FIG. 9). Rela 117 is disabled at once. Computation of the product be gins. Upon completion of this operation amplifier 11: registers the result and feeds it to computation unit 17 This unit instantly finds the optimum (the least) summar signal K, which is delivered to output unit 18, where th additional driving signal $U_s$ is computed.

Step 4: command generation

At the moment of billet 8 coming to the line of cuttin; of shears 19 relay 181 is disabled. Contacts 182 of thi relay disconnect output unit 18 from the rest of comput ing device 23 and it is brought over to the registerin; mode, and by contacts 183 of the same relay it is con nected to automatic regulator 20 of the velocity of shear 19.

The signal $U_s$ being fed to drive 21 from regulator 20 causes a change in the speed of drive 187. The length o the length pieces out from the billet on its coming fron finishing stands 3 of the mill is changed accordingly. Th last piece turns out to be of the same length as the pro ceeding ones obtained from the given billet, i.e. wasteles cutting of metal is thus achieved.

The limiting of the signals of output unit 18 provide for such length of the pieces which under any condition remains within the tolerance.

On coming out of the rear end of the billet from finish ing stands 3 of the mill position transducers 10 and 1 are disconnected in succession. The units of the compul ing device return to their initial states. The operation cycl is completed.

Due to the registering properties of the output unit th measurement of the parameters of a successive billet fo wasteless cutting can be started before the cycle has bee completed. If by any reasons there appears an error a the output of the device, it can be eliminated by the op rator by adjusting the potentiometers mounted on control panel 22 (FIG. 11). Potentiometers 28 and 29 incorporated in the circuit of velocity unit 13 are meant for compensating the constant instrumental error of the device, and potentiometers 192 and 193 incorporated in the circuit of output unit 18 are meant for compensating the proportional error.

Control panel 22 of the device is disposed at the control post of shears 19. The control panel mounts various means for switching on and off of the device and for an operative control of the work of its separate units.

Besides, by means of said panel the operation of the device can be corrected.

The panel is provided with two switches. Switch 200 serves for connecting output unit 18 of computing device 13 to automatic regulator 20 of the velocity of shears 19. The value of the output signal of the device as well as the moment of feeding this signal to said regulator is controlled by voltmeter 201 provided on the control panel.

Switch 202 serves for selecting the program of the device operation according to the assortment (cross-section and the length of cutting) of the billets rolled in the mill. By means of this switch voltage is supplied to the coils of relays 40 or 41. The contacts of said relays are connected into the circuits of velocity unit 13, lengths unit 14, length pieces unit 15 and output unit 18 where they serve for switching over the resistors representing the parameters of the billet being rolled.

By means of switch 200 voltage of 110 volts is supplied to the signal lights of the control panel. Bulb 203 indicates the position of switch 200, i.e. whether the device is in operation. Neon bulbs 204, 205, 206, 207 indicate the operation of photorelays 4, 5, 6 and 7, i.e. the position of billet 8 on roll table 1 before finishing stands 3 of the mill.

As it has been pointed out above, control panel 22 mounts regulators for correcting and adjusting computing device 23. Regulators 28 and 29 are connected into the input circuit of velocity unit 13, and regulators 192 and 193 are connected into the feedback circuit of output unit 18.

What is claimed is:

1. A device for wasteless cutting of metal of a billet which is being rolled comprising flying shears, a drive for said shears, an automatic velocity regulator for said drive; a computing means controlling said regulator, means positioned along the path of the billet being rolled to detect the movement of the rear end of said billet and the length of the billet, and means measuring the travel of the billet being rolled, the latter said means being coupled to said computer means.

2. A device for wasteless cutting of a billet being rolled comprising flying shears, a drive for said shears, an automatic velocity regulator for said drive; a computing means comprising a velocity unit, a search unit, a length unit, a length pieces unit, a unit, a computing unit and an output unit which cooperatively generate a summary signal; input means feeding individual signals to said computing means and including photoelectric transducers positioned along the path of the billet being rolled, a transducer measuring the velocity of the billet being rolled, and transducers measuring the travel of the billet being rolled, said computing means transmitting said summary signal to said automatic regulator, said velocity unit generating a signal corresponding to the actual velocity of the billet being rolled, said search unit and said lengths unit generating signals corresponding to the actual length of the billet being rolled, said lengths unit and said velocity unit generating a signal corresponding to the expected number of length pieces the billet is to be cut into, said product unit effecting delay of the signals fed thereto from said velocity unit and said lengths unit, said computation a plurality of individual summary signals, one of said individual summary signals being automatically separated by the same unit, said separated signal being of the signal of least value, said output unit receiving said signal of least value and computing an additional driving signal by means of multiplying said signal of least value by a value proportional to the main driving signal of said regulator and feeding said additional driving signal to said regulator.

3. A device as claimed in claim 1 wherein the means to detect the movement of the billet includes a tachometer.

4. A device as claimed in claim 1 wherein the means to detect the movement of the billet includes means to compare normal and instantaneous velocities of the billet.

5. A device as claimed in claim 1 wherein the means to detect the movement of the billet includes a tachometer and a friction roll to drive said tachometer.

6. A device as claimed in claim 1 wherein the means to detect the movement of the billet includes photoelectric transducers.

7. A device as claimed in claim 1 wherein the means to detect the movement of the billet and the dimensions thereof is coupled to said computer means.

References Cited

UNITED STATES PATENTS

| 2,692,361 | 10/1954 | Asbury et al. | 83—288 X |
| 2,958,243 | 11/1960 | Foster | 83—364 X |
| 3,174,316 | 3/1965 | Sigal | 72—203 X |
| 3,251,255 | 5/1966 | Bauman | 83—364 X |

JAMES M. MEISTER, *Primary Examiner.*

U.S. Cl. X.R.

83—364, 365